(12) United States Patent
Koyama

(10) Patent No.: US 12,124,746 B2
(45) Date of Patent: Oct. 22, 2024

(54) PRINTING CONTROL APPARATUS AND NON-TRANSITORY COMPUTER READABLE MEDIUM STORING PROGRAM THAT MANAGE OUTPUT OF DOCUMENT DATA BASED ON PRINTING RESTRICTION INFORMATION

(71) Applicant: FUJIFILM Business Innovation Corp., Tokyo (JP)

(72) Inventor: Yuichiro Koyama, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 331 days.

(21) Appl. No.: 17/411,047

(22) Filed: Aug. 24, 2021

(65) Prior Publication Data

US 2022/0269453 A1 Aug. 25, 2022

(30) Foreign Application Priority Data

Feb. 22, 2021 (JP) .................................. 2021-026530

(51) Int. Cl.
*G06F 3/12* (2006.01)

(52) U.S. Cl.
CPC .......... *G06F 3/1222* (2013.01); *G06F 3/1238* (2013.01); *G06F 3/1273* (2013.01)

(58) Field of Classification Search
None
See application file for complete search history.

(56) References Cited

U.S. PATENT DOCUMENTS

| 11,593,049 | B2* | 2/2023 | Kato | G06F 3/1232 |
| 2012/0069381 | A1* | 3/2012 | Nagai | G06F 3/1222 |
| | | | | 358/1.14 |
| 2013/0321850 | A1* | 12/2013 | Tsuji | G06K 15/4095 |
| | | | | 358/1.14 |
| 2015/0109633 | A1* | 4/2015 | Kang | G06F 3/1243 |
| | | | | 358/1.14 |

(Continued)

FOREIGN PATENT DOCUMENTS

| JP | 2004227447 | 8/2004 |
| JP | 2007188477 | 7/2007 |

(Continued)

OTHER PUBLICATIONS

"Notice of Reasons for Refusal of Japan Counterpart Application", issued on Aug. 20, 2024, with English translation thereof, p. 1-p. 13.

*Primary Examiner* — Henok Shiferaw
(74) *Attorney, Agent, or Firm* — JCIPRNET

(57) ABSTRACT

A printing control apparatus includes a processor configured to receive instruction information including document data and information indicating whether or not it is necessary to inquire an external apparatus that holds restriction information indicating a condition for restricting printing of the document data, in a case where the instruction information includes the information indicating that the inquiry is necessary, acquire the restriction information in a case where the restriction information associated with the document data exists by inquiring the external apparatus, and permit printing of the document data in a case where information to be compared with the acquired restriction information satisfies the condition indicated by the restriction information.

16 Claims, 8 Drawing Sheets

(56) References Cited

U.S. PATENT DOCUMENTS

| | | | | |
|---|---|---|---|---|
| 2015/0186078 A1* | 7/2015 | Ozawa | ............... | G06F 3/1288 |
| | | | | 358/1.13 |
| 2020/0301636 A1* | 9/2020 | Kurosawa | ............. | G06F 3/1253 |
| 2021/0089253 A1* | 3/2021 | Kaneko | ................ | G06F 3/1213 |
| 2022/0283758 A1* | 9/2022 | Tojo | ..................... | G06F 21/608 |
| 2022/0383270 A1* | 12/2022 | Yamagishi | ............. | G06Q 10/20 |

FOREIGN PATENT DOCUMENTS

| | | |
|---|---|---|
| JP | 2015170003 | 9/2015 |
| JP | 2020055218 | 4/2020 |

* cited by examiner

| TICKET ID | : Ticket001 |
| DOCUMENT ID | : D001 |
| CONFIDENTIAL LEVEL | : HIGH |
| PRINTING REQUESTER | : User A |
| PAPER TYPE | : PLAIN PAPER |
| NUMBER OF TIMES IN WHICH PRINTING IS POSSIBLE | : FIVE TIMES |
| CONTROL INFORMATION | : ONE-SIDED/2up /NON POST-PROCESSING |
| PLACE AT WHICH PRINTING IS POSSIBLE | : HODOGAYA-KU, YOKOHAMA |
| TIME AT WHICH PRINTING IS POSSIBLE | : 10:00 TO 11:00 |
| ... | |

| TICKET ID | : Ticket002 |
| DOCUMENT ID | : D002 |
| CONFIDENTIAL LEVEL | : LOW |
| PRINTING REQUESTER | : |
| PAPER TYPE | : |
| NUMBER OF TIMES IN WHICH PRINTING IS POSSIBLE | : |
| CONTROL INFORMATION | : |
| PLACE AT WHICH PRINTING IS POSSIBLE | : |
| TIME AT WHICH PRINTING IS POSSIBLE | : |
| ... | |

FIG. 4

USER ID: User A

| DOCUMENT ID | NUMBER OF TIMES IN WHICH PRINTING IS POSSIBLE | ... |
|---|---|---|
| D001 | FOUR TIMES | ... |
| D002 | TWO TIMES | ... |
| ... | ... | ... |

PRINTING CONTROL APPARATUS AND NON-TRANSITORY COMPUTER READABLE MEDIUM STORING PROGRAM THAT MANAGE OUTPUT OF DOCUMENT DATA BASED ON PRINTING RESTRICTION INFORMATION

CROSS-REFERENCE TO RELATED APPLICATIONS

This application is based on and claims priority under 35 USC 119 from Japanese Patent Application No. 2021-026530 filed Feb. 22, 2021.

BACKGROUND

(i) Technical Field

The present invention relates to a printing control apparatus and a non-transitory computer readable medium storing a program.

(ii) Related Art

In recent years, a printing system has been proposed that enables printing only within a printing restriction range set for a document file without determination of a printing requester who requests printing of the document file (for example, refer to JP2004-227447A).

The printing system disclosed in JP2004-227447A includes a printing permission determination unit that receives document content, a printing restriction information table, and a printing request information table, and determines whether or not printing is possible, in which the printing permission determination unit permits printing of the document content in a case where printing request information included in the printing request information table satisfies printing restriction information included in the printing restriction information table.

SUMMARY

Aspects of non-limiting embodiments of the present disclosure relate to a printing control apparatus and a non-transitory computer readable medium storing a program that can manage an output of document data according to an intention of a person who manages restriction information that restricts printing of the document data.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a printing control apparatus including a processor configured to receive instruction information including document data and information indicating whether or not it is necessary to inquire an external apparatus that holds restriction information indicating a condition for restricting printing of the document data, in a case where the instruction information includes the information indicating that the inquiry is necessary, acquire the restriction information in a case where the restriction information associated with the document data exists by inquiring the external apparatus, and permit printing of the document data in a case where information to be compared with the acquired restriction information satisfies the condition indicated by the restriction information.

BRIEF DESCRIPTION OF THE DRAWINGS

Exemplary embodiment(s) of the present invention will be described in detail based on the following figures, wherein:

FIG. 3A is a diagram showing an example of a printing restriction information ticket for a document having a confidential level of "high", and FIG. 3B is a diagram showing an example of a printing restriction information ticket for a document having a confidential level of "low";

FIG. 4 is a diagram showing an example of a history information table;

DETAILED DESCRIPTION

Figure 1:
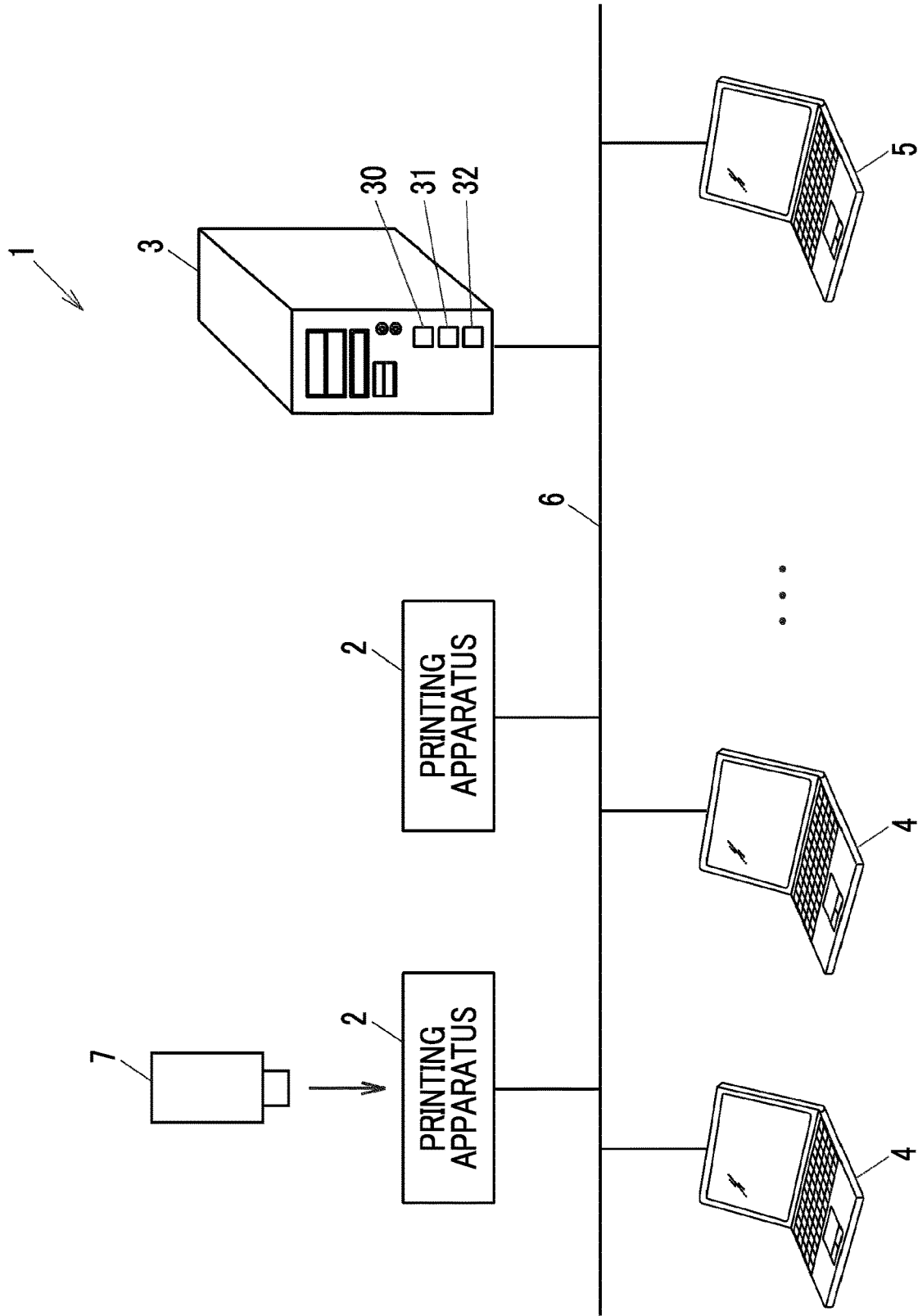
FIG. 1 is a diagram showing an example of a schematic configuration of a printing system according to an exemplary embodiment of the present invention.

Hereinafter, an exemplary embodiment of the present invention will be described with reference to the accompanying drawings. In each drawing, components having substantially identical functions are designated by identical reference numerals, and description thereof will not be repeated.

Summary of Exemplary Embodiment

A printing control apparatus according to the present exemplary embodiment includes a processor configured to receive instruction information including document data and information indicating whether or not it is necessary to inquire an external apparatus holding restriction information indicating a condition for restricting printing of the document data, in a case where the instruction information includes the information indicating that the inquiry is necessary, acquire the restriction information in a case where the restriction information associated with the document data exists by inquiring the external apparatus, and permit printing of the document data in a case where information to be compared with the acquired restriction information satisfies the condition indicated by the restriction information.

The document data may include figures, images, moving images, sounds, and the like, in addition to documents in which text are written. Some document data may have different degrees of confidentiality. That is, confidentiality is necessary for some document data and confidentiality is not necessary for some document data. The document data in which confidentiality is necessary have high confidentiality, low confidentiality, or the like. The degree of confidentiality may be expressed, for example, at a confidential level, and may be expressed at a plurality of stages of confidential levels such as confidential levels of 0 and 1, confidential levels of 0, 1, and 2, and confidential levels of 0, 1, 2, 3, ..., from the document data in which confidentiality is not necessary to the document data in which high confidentiality is necessary.

The restriction information may be expressed using a condition that permits printing, or may be expressed using a condition that prohibits printing. The condition may be an AND condition or an OR condition.

The restriction information and the information to be compared with the restriction information include, for example, the followings.

(a) Information on Place Where Printing Apparatus Used for Printing Is Installed The information on the place may be in prefecture units, local units such as a Kanto region and a Tohoku region, or ku (ward) or municipality units.

(b) Time at Which Printing Is Performed

A time zone between a start time and an end time or units, such as morning or afternoon and a day of the week, may be provided.

(c) Information on Person Who Requests Printing

For example, information, such as a user ID or a user name, that specifies an individual, information, such as a department or group to which the individual belongs, that specifies an organization, and the like may be provided.

(d) Information about Print Setting Information

Print setting information refers to information related to print setting such as a tray to be used (a recording paper size, a paper orientation, a paper quality, and the like are specified), an enlargement or reduction size, black-and-white or color printing, one-sided or two-sided printing, N-up printing (images corresponding to N pages are printed on one sheet of paper), and the number of copies to be printed. In addition, the print setting information may include a specific page for which printing is permitted or a specific page for which printing is prohibited. The specific page for which printing is prohibited corresponds to, for example, a case where confidentiality is not necessary for an entire document but confidentiality is necessary for only a specific page.

(e) Combination of (a) to (d)

For example, a combination of (c) and (d) corresponds to a case where color printing is permitted for a specific department, but color printing is prohibited and only black-and-white printing is permitted for departments other than the specific department.

Exemplary Embodiment

FIG. 1 is a diagram showing an example of a schematic configuration of a printing system according to an exemplary embodiment of the present invention. A printing system 1 includes a plurality of printing apparatuses 2, a server 3, a plurality of user terminals 4 used by users (also referred to as users or printing requesters) of the printing apparatuses 2, a manager terminal 5 used by a manager, and a network 6 connecting the printing apparatuses 2, the server 3, the user terminals 4, and the manager terminal 5. The printing apparatus 2 is an example of an image forming apparatus to which the printing control apparatus is applied. The server 3 is an example of the external apparatus. The user is an example of the person who requests printing. The manager is an example of a person who has an authority to change the restriction information.

Although the plurality of printing apparatuses 2 are shown in FIG. 1, one printing apparatus 2 may be configured to be connected to the network 6. Further, a place where the printing apparatus 2 is installed may be, for example, in the same building of an identical company, or in different buildings such as a head office and a branch office. Further, the place where the printing apparatus 2 is installed is not limited to the identical company, and may be in a facility such as a school, a hospital, a shared office, or a convenience store.

The server 3 holds a ticket management information table 30 (see FIG. 2), printing restriction information tickets 31a and 31b (in a case where the printing restriction information tickets 31a and 31b are collectively referred to, hereinafter, referred to as "printing restriction information ticket 31") for documents having different confidential levels (see FIGS. 3A and 3B), and a history information table 32 (see FIG. 4). The confidential level indicates the degree of confidentiality, and the higher the confidential level, the higher the confidentiality.

The ticket management information table 30 is a table in which the document is associated with the printing restriction information ticket 31. The printing restriction information ticket 31 records a condition for restricting printing of each document. The history information table 32 records a usage record of the printing apparatus 2 for each user.

The user terminal 4 and the manager terminal 5 are information processing terminals such as a Personal Computer (PC). The user terminal 4 and the manager terminal 5 may be a portable information processing terminal such as a notebook computer or a tablet terminal, or a mobile communication terminal such as a multifunctional mobile phone (smartphone).

The user terminal 4 converts document data into print data which can be interpreted by the printing apparatus 2, for example, print data described in a Page Description Language (PDL), using a printer driver, adds, to the print data, the print setting information that is recorded with various types of setting (for example, various printing conditions such as two-sided or one-sided, and the number of copies) necessary for execution of printing, the user ID that identifies the user, and a document ID that identifies a document, and transmits the print data to the printing apparatus 2 designated by the user, as a print job. In a case of performing post-processing, the printer driver adds post-processing information, which indicates content of the post-processing, to the print job. A configuration of the print job will be described later.

The network 6 is, for example, a Local Area Network (LAN), a Wide Area Network (WAN), an intranet, the Internet, or the like, and may be wired or wireless.

Figure 2:
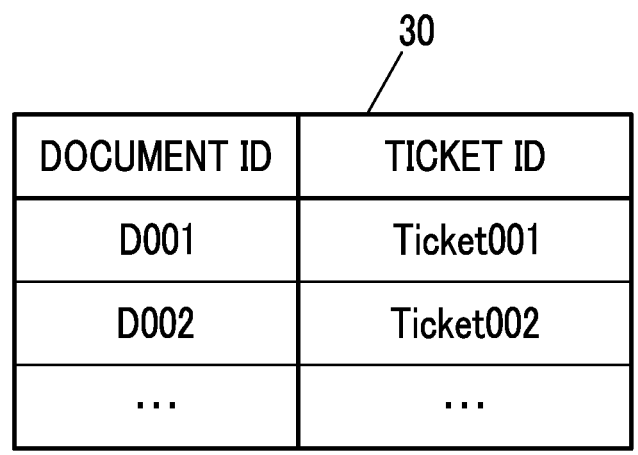
FIG. 2 is a diagram showing an example of a ticket management information table.

FIG. 2 is a diagram showing an example of the ticket management information table 30. The ticket management information table 30 includes each item of a "document ID" and a "ticket ID". The ticket management information consisting of the items is recorded by the server 3 based on the operation of the manager.

In the "document ID", a document ID that identifies a document to be processed is recorded. In the "ticket ID", a ticket ID that identifies the printing restriction information ticket 31 is recorded. In the ticket management information table 30, the document to be processed and the printing restriction information ticket 31 are associated with each other using the document ID and the ticket ID.

Configuration of Printing Restriction Information Ticket

FIG. 3A is a diagram showing an example of the printing restriction information ticket 31a for a document having a confidential level of "high", and FIG. 3B is a diagram showing an example of a printing restriction information ticket 31b for a document having a confidential level of "low".

The printing restriction information ticket 31 is configured so that presence and absence of restriction and content of the restriction can be set for each item in printing restriction information. That is, in the printing restriction information ticket 31, for information related to a print target (also referred to as print target information) specified by the "ticket ID", the "document ID", and the "confidential level", the printing restriction information consisting of a plurality of items including a "printing requester", a "paper type", "the number of times in which printing is possible", "control information" (including the print setting information and the post-processing information), a "place at which printing is possible", and a "time at which printing is possible" is recorded by the server 3 according to the operation of the manager. The items of the printing restriction information are not limited thereto. In addition, the items of the printing restriction information are excluded or the content is not recorded in a case where the restriction is unnecessary, but is added in a case where there is another necessary item. The items of the printing restriction information shown in FIGS. 3A and 3B are set using an AND condition for permitting printing in a case where all the items are satisfied. The items of the printing restriction information may be set using an OR condition as a condition for permitting printing, or may be set by an AND condition or an OR condition as a condition for prohibiting printing.

The printing restriction information ticket 31a shown in FIG. 3A relates to print target information in which the ticket ID is "Ticket001", the document ID is "D001", and the document confidential level is "high". In a case shown in FIG. 3A, the "printing requester" who can perform printing is limited to a "User A". In addition, the "paper type" is limited to plain paper, "the number of times in which printing is possible" is limited to 5 times, the "control information" is limited to one-sided/2Up/non post-processing, the "place at which printing is possible" is limited to Hodogaya-ku, Yokohama, and the "time at which printing is possible" is limited to 10:00 to 11:00, respectively.

The printing restriction information ticket 31b shown in FIG. 3B relates to print target information in which the ticket ID is "Ticket002", the document ID is "D002", and the document confidential level is "low". In a case shown in FIG. 3B, the "printing requester" who can perform printing is blank, so there is no restriction. Further, the "paper type", the "control information", the "place at which printing is possible", and the "time at which printing is possible" are also blanks, so that there is no restriction. In the printing restriction information tickets 31a and 31b shown in FIGS. 3A and 3B, the "printing requester" is an example of information on a requester. In the printing restriction information ticket 31b shown in FIG. 3B, printing may be restricted by any of the items of the "printing requester", the "paper type", "the number of times in which printing is possible", the "control information", the "place at which printing is possible", and the "time at which printing is possible". Further, printing may be restricted by each of the items by reducing the number of items of the printing restriction information rather than the printing restriction information ticket 31a shown in FIG. 3A.

Configuration of History Information Table

FIG. 4 is a diagram showing an example of the history information table 32. The history information table 32 is provided for each user ID. FIG. 4 relates to the user ID "User A". The history information table 32 includes a plurality of items such as "document ID" and "printing". The history information consisting of the items is recorded by the server 3 at a necessary timing which will be described later based on information indicating the usage record periodically transmitted from the printing apparatus 2.

In the "document ID", as the same as in FIG. 2, the document ID that identifies the document to be processed is recorded. In the "printing", the total number of copies and prints is recorded. An item, such as "scan", may be provided in addition to the "printing".

Configuration of Printing Apparatus

Figure 5:
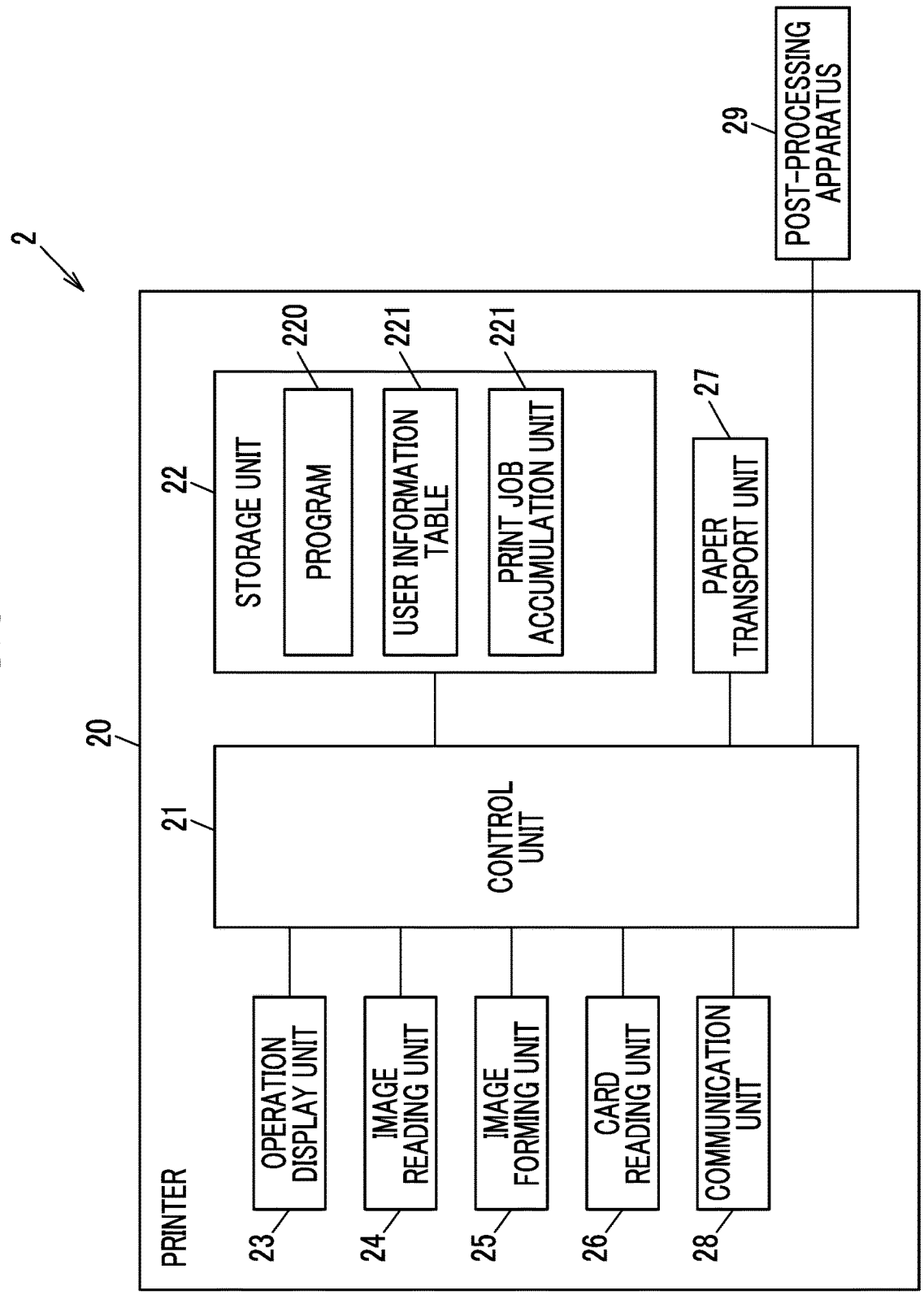
FIG. 5 is a block diagram showing an example of a configuration of a printing apparatus.

FIG. 5 is a block diagram showing an example of a configuration of the printing apparatus 2. The printing apparatus 2 includes a printer 20 and a post-processing apparatus 29. The printer 20 is, for example, a multifunctional device having a plurality of functions such as scan, print, and copy. The post-processing apparatus 29 executes post-processing on printed paper.

The post-processing includes, for example, needle binding (also referred to as stapling), needleless binding (also referred to as needleless stapling), drilling (also referred to as punching), folding, bookbinding, cutting, and the like. The "stapling" refers to a process of binding a plurality of sheets of paper with a needle. The "punching" refers to a process of punching two holes in the paper. The "folding" refers to a process of folding the paper into a Z shape.

The printer 20 includes a control unit 21 that controls each unit of the printing apparatus 2, in which the control unit 21 is connected to a storage unit 22, an operation display unit 23, an image reading unit 24, an image forming unit 25, a card reading unit 26, a paper transport unit 27, and a communication unit 28, and further is connected to a post-processing apparatus 29. The printer 20 and the post-processing apparatus 29 are connected to each other by a paper transport path (not shown). The printing apparatus 2 may not include the post-processing apparatus 29.

The control unit 21 is configured with a processor such as a Central Processing Unit (CPU), an interface, and the like. The processor of the control unit 21 executes jobs, such as a print job, a scan job, and a copy job, by executing a program 220 stored in the storage unit 22. The print job is an example of instruction information.

The print job is a job of printing and outputting the print data included in the job transmitted from the user terminal 4 on the paper by the image forming unit 25. The print job includes the user ID who requests the job, the print data, the print setting information, and the post-processing information in a case of being requested. The post-processing information indicates the content of the post-processing to be performed on the paper on which the print data is printed according to the print setting information.

The scan job is a job of reading image data from a manuscript by the image reading unit 24. The copy job is a job of printing and outputting the image data obtained by the scan job on paper by the image forming unit 25. Each of the print job and the copy job is also referred to as a printing job.

The storage unit 22 is configured with a Read Only Memory (ROM), a Random Access Memory (RAM), a hard disk, and the like, and stores various types of information such as information on the program 220, the user information table 221, the print job accumulation unit 222, and a place of an address at which the printing apparatus 2 is installed (hereinafter, referred to as "installation place information").

The operation display unit 23 inputs and displays information. The operation display unit 23 is, for example, a touch panel display, and has a configuration in which a touch panel is arranged to be superimposed on a display such as a liquid crystal display.

The image reading unit 24 includes an automatic paper feeding device provided on a platen, and a scanner that optically reads a manuscript image from a manuscript placed on the platen or a manuscript sent by the automatic paper feeding device.

The image forming unit 25 creates a printed matter by forming an image on the paper fed from a paper feed cassette by, for example, an electrophotographic method, an inkjet method, or the like. The image forming unit 25 converts the print data described in the PDL into image data consisting of raster data, and prints the image data on paper according to the print setting information included in the print job.

In a case where an IC card possessed by the user is held over, the card reading unit 26 reads a user ID and a password as user information from the IC card.

The paper transport unit 27 transports the paper fed from a paper feed tray to the image forming unit 25 under the control of the control unit 21, transports the printed paper to a discharge tray in a case where the post-processing is not performed, transports the paper to the post-processing apparatus 29 via the paper transport path in a case where the post-processing is performed, and transports the paper whose post-processing has been performed to the discharge tray.

The communication unit 28 is connected to the printing apparatus 2, the server 3, the user terminal 4, and the manager terminal 5 via the network 6.

In the user information table 221, the user ID and the password are recorded for each user. The user information consisting of the user ID and the password is recorded by the control unit 21 based on the operation of the manager.

The print job accumulation unit 222 is an area in which the print job read and received by the printing apparatus 2 from the recording medium 7 such as USB, or the print job received by the printing apparatus 2 from the user terminal 4 or another printing apparatus 2 is accumulated for each user ID.

Figure 6:
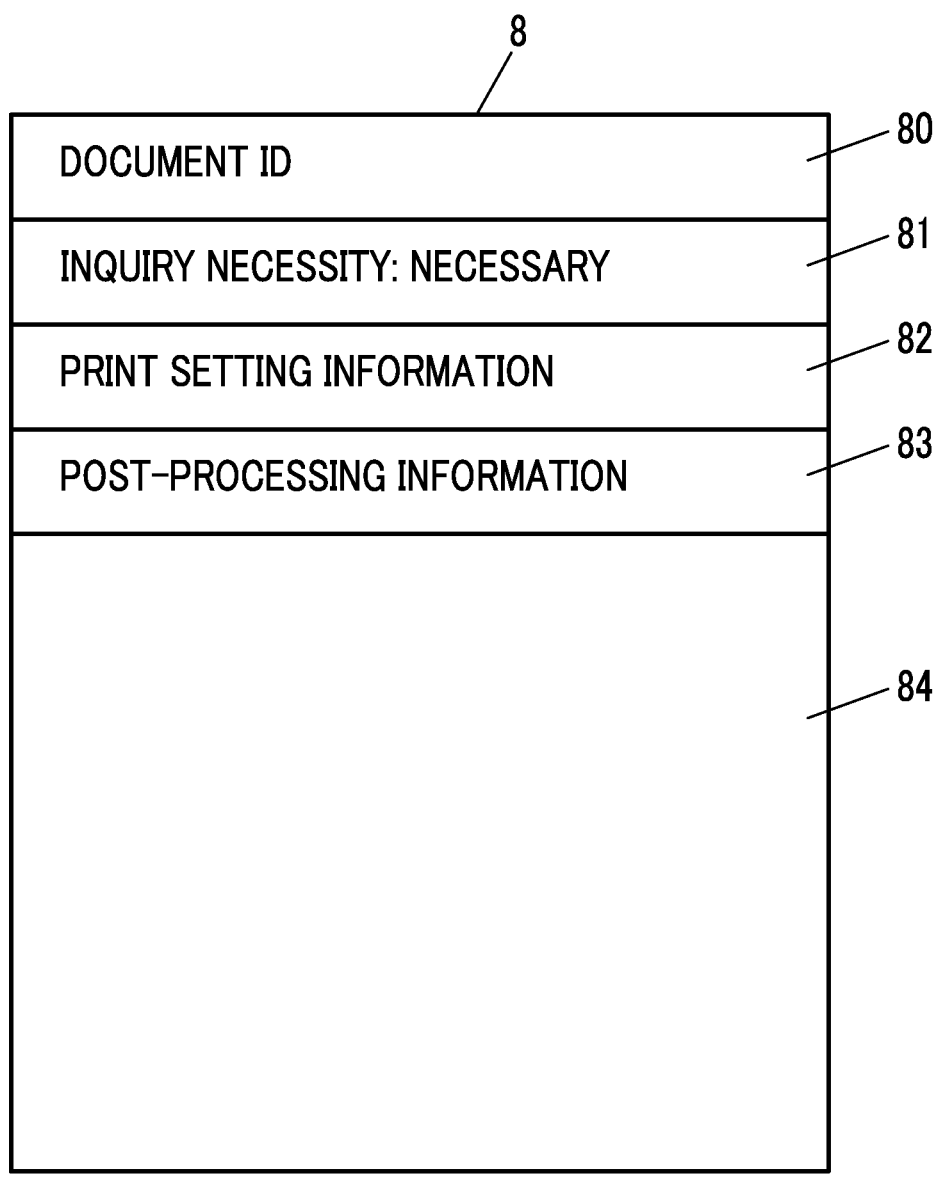
FIG. 6 is a diagram showing an example of a configuration of a print job.

FIG. 6 is a diagram showing an example of a configuration of a print job 8 accumulated in the print job accumulation unit 222. The print job 8 includes attribute information 80, inquiry necessity information 81, print setting information 82, post-processing information 83, and print data 84. In a case where the post-processing is not performed, the post-processing information 83 is not included in the print job 8. The attribute information 80 includes the document ID that identifies the document. Instead of the document ID, document identification information, such as a document name, may be used. In the inquiry necessity information 81, "necessary" is recorded in a case where an inquiry is necessary, and "not necessary" is recorded in a case where the inquiry is not necessary.

Next, the control unit 21 will be described.

In a case where the control unit 21 receives the print job 8 from the recording medium 7, the user terminal 4, or the other printing apparatus 2, the control unit 21 accumulates the received print job 8 in the print job accumulation unit 222 corresponding to the user ID included in the print job 8. Further, the control unit 21 periodically (for example, 18:00 every day) transmits content of the executed job to the server 3 as the history information.

The control unit 21 permits printing in a case where the information to be compared with the printing restriction information (hereinafter, also referred to as "request information") satisfies a condition indicated by the printing restriction information recorded in the printing restriction information ticket 31.

The control unit 21 acquires the request information by the following method. The printing requester may be acquired, for example, in a case where the user logs in or in a case where an authentication process of the print job accumulation unit 222 is performed. The paper type and the control information may be acquired from, for example, the print setting information 82 and the post-processing information 83 which are included in the print job 8. A place where the printing is performed may be acquired from the installation place information of the printing apparatus 2 stored in the storage unit 22. A time at which printing is performed may be a time at which the print job 8 to be executed by the user is selected from a list of print jobs 8 displayed on the operation display unit 23.

Operation of Printing System

Figure 7:
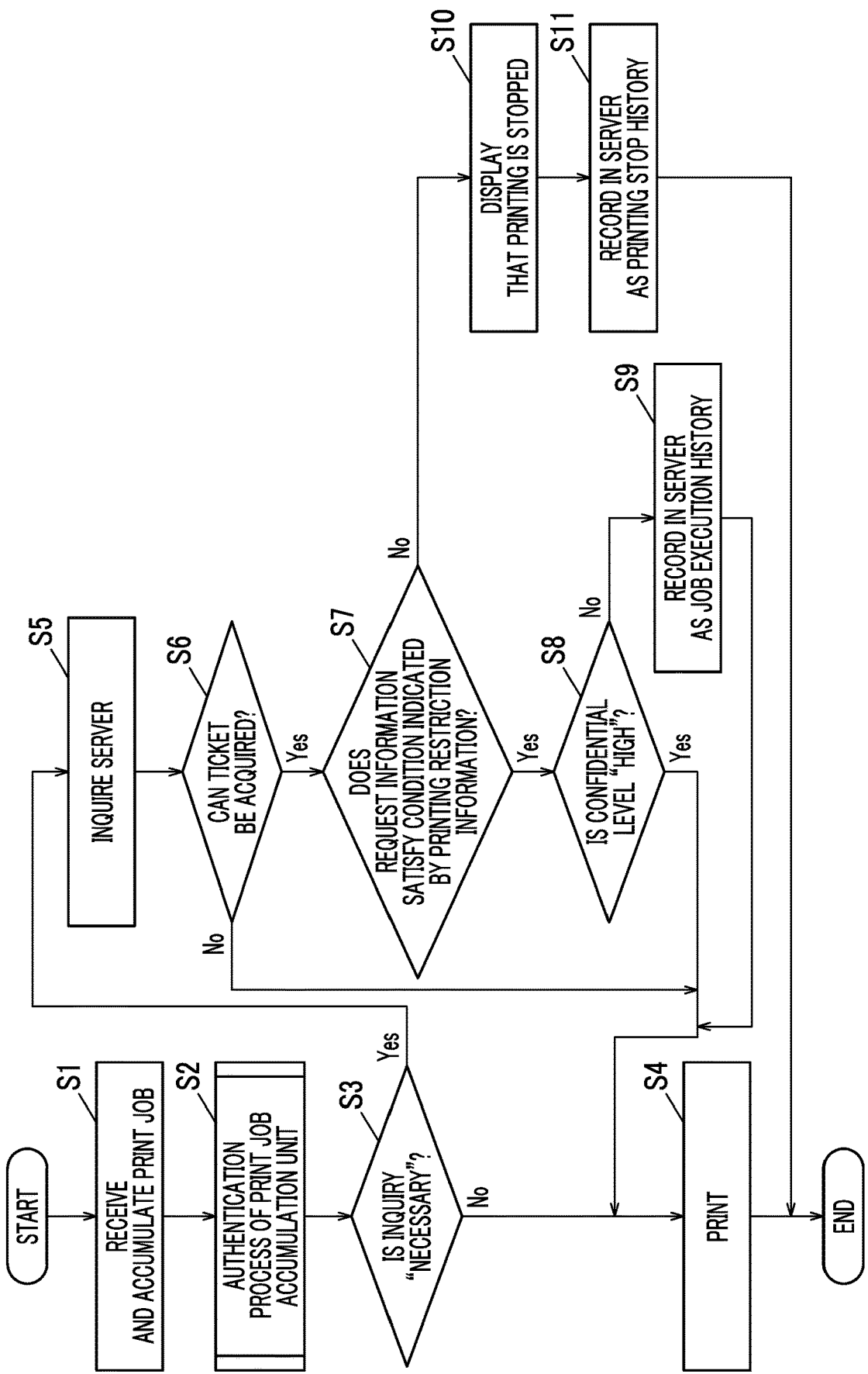
FIG. 7 is a flowchart showing an example of an operation of the printing apparatus.
Figure 8:
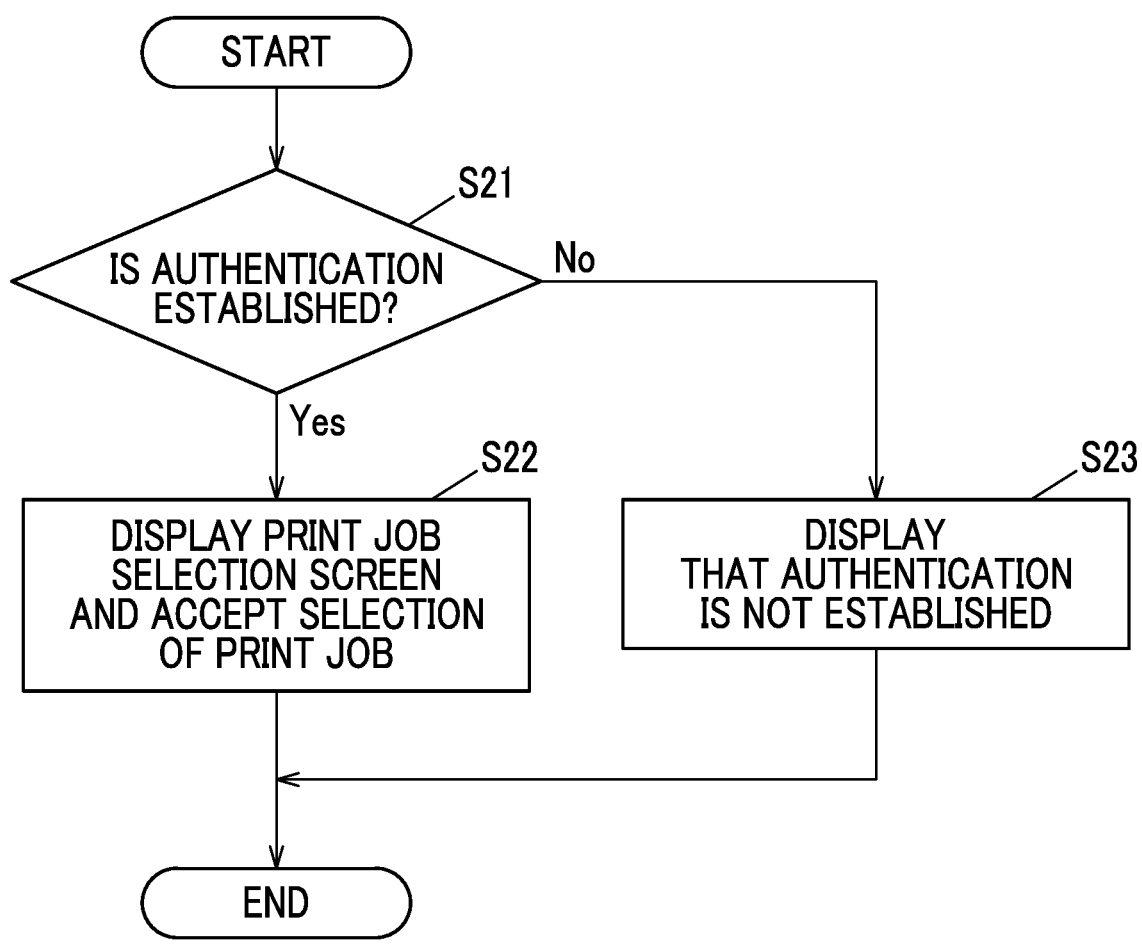
FIG. 8 is a flowchart showing details of step S2 shown in FIG. 7.

Next, an example of an operation of the printing system 1 will be described with reference to FIGS. 7 and 8. FIG. 7 is a flowchart showing an example of an operation of the printing apparatus 2. FIG. 8 is a flowchart showing details of step S2 shown in FIG. 7. Unless specified otherwise, it is assumed that the control unit 21 of the printing apparatus 2 executes the operation.

(1) Operation in Case Where Printing Restriction Information Is Not Changed

The control unit 21 of the printing apparatus 2 receives the print job 8 from the recording medium 7 (S1). The control unit 21 accumulates the received print job 8 in the print job accumulation unit 222 corresponding to the user ID included in the print job 8. The print job 8 may be transmitted from the user terminal 4 or the other printing apparatus 2.

In a case where the user holds an IC card possessed by the user over the card reading unit 26, the control unit 21 starts the authentication process of the print job accumulation unit 222 shown in FIG. 8 (S2).

The card reading unit 26 reads the user information consisting of the user ID and the password from the IC card, and outputs the user information to the control unit 21. The control unit 21 determines whether or not the authentication is established depending on whether or not the user information output from the card reading unit 26 is recorded in the user information table 221 (S21).

In a case where the authentication is established (S21: Yes), a print job selection screen is displayed on the operation display unit 23, and selection of the print job 8 is accepted (S22). On the print job selection screen, a list of print jobs 8 accumulated in the print job accumulation unit 222 of the authenticated user is displayed so that the user can select a print job 8 to be executed from the list of print jobs 8. In a case where the user selects the print job 8 and operates a "confirm" button, the control unit 21 reads the print job 8 from the print job accumulation unit 222.

In a case where the authentication is not established in step S21 (S21: No), a gist that the authentication is not established is displayed on the operation display unit 23 (S23).

In a case where the authentication process of the print job accumulation unit 222 is completed, in step S3 shown in FIG. 7, the control unit 21 determines whether or not the inquiry necessity information 81 of the print job 8 indicates that the inquiry is necessary (S3).

In a case where the inquiry necessity information 81 does not indicate that the inquiry is necessary (S3: No), the image forming unit 25 is controlled so that the print data 84 included in the print job 8 is printed according to the print setting information 82 (S4). In a case where the print job 8 includes the post-processing information 83, the post-processing apparatus 29 executes the post-processing after printing.

In a case where the inquiry necessity information 81 indicates that the inquiry is necessary in step S3 (S3: Yes), the control unit 21 inquiries the server 3 about whether or not the printing restriction information ticket 31 is set for the document ID included in the attribute information 80 of the print job 8 (S5). In a case where the ticket ID corresponding to the document ID included in the inquiry exists in the ticket management information table 30, the server 3 transmits the printing restriction information ticket 31 corresponding to the ticket ID to the printing apparatus 2. For example, in a case where the document ID included in the attribute information 80 of the print job 8 is "D001", as shown in FIG. 2, a ticket ID "Ticket 001" corresponding to the document ID "D001" is recorded in the ticket management information table 30, so that it is determined that the ticket ID exists.

As a result of inquiring to the server 3, the control unit 21 determines whether or not the printing restriction information ticket 31 can be acquired (S6). In a case where the printing restriction information ticket 31 cannot be acquired because the ticket ID does not exist in the ticket management information table 30 (S6: No), printing is executed in the same manner as in a case where it is not indicated that the inquiry is necessary in step S3 (S3: No) (S4).

The control unit 21 acquires the request information to be compared with the printing restriction information, and determines whether or not the request information satisfies the condition indicated by the printing restriction information recorded in the printing restriction information ticket 31 (S7).

Here, a case where the printing restriction information ticket 31a is shown in FIG. 3A will be described. In this case, the printing requester of the printing restriction information is the "User A". Therefore, in a case where the user ID of the user requesting printing is other than the "User A", printing of the document having the document ID "D001" is prohibited. Further, since the paper type of the printing restriction information is plain paper, printing on thin paper or thick paper other than plain paper is prohibited.

Since the number of times, in which printing is possible, of the printing restriction information is "5 times", the control unit 21 accesses the server 3 and acquires the number of times of printing "4 times" of the document ID "D001" from the history information table 32 related to the user ID "User A". Since the acquired number of times of printing "4 times" is equal to or less than the number of times, in which printing is possible, "5 times" of the printing restriction information, it is determined that the condition is satisfied. In a case where the item for the number of times in which printing is possible does not exist in the printing restriction information ticket 31a, the number of times of printing is not acquired from the history information table 32.

Since the restriction information of the printing restriction information is one-sided/2up/non post-processing, one-sided printing other than 2-up printing and two-sided printing are prohibited. Printing that requires the post-processing is also prohibited.

Since the place where printing of the printing restriction information is possible is in Hodogaya-ku, Yokohama, the control unit 21 acquires the installation place information from the storage unit 22 and determines whether or not the request information satisfies the condition depending on whether or not the installation place information is Hodogaya-ku, Yokohama.

Since the time, at which printing is possible, of the printing restriction information is from 10:00 to 11:00, for example, the control unit 21 determines that the request information satisfies the condition in a case where the time, at which the print job 8 to be executed by the user is selected from the list of print jobs 8 displayed on the operation display unit 23, is included in the time from 10:00 to 11:00, and determines that the request information does not satisfy the condition in a case where the time is not included in the time from 10:00 to 11:00.

In a case where the request information satisfies the condition indicated by the printing restriction information (S7: Yes), it is determined whether or not the confidential level of the printing restriction information is "high" (S8). In a case where the confidential level is "high" (S8: Yes), printing is executed in the same manner as described above (S4).

In a case where the confidential level is "low" (S8: No), the server 3 records execution content (for example, the user ID, the total number of times of printing so far, and the like) of the print job 8 in the history information table 32 as a history.

In step S7, in a case where the request information does not satisfy the condition indicated by the printing restriction information (S7: No), the control unit 21 displays "printing is stopped" on the operation display unit 23 (S10). A fact that printing has been stopped is recorded in the server 3 as the history information (S11). In a case where "printing is stopped" is displayed on the operation display unit 23, the control unit 21 may display the condition which is not satisfied by the request information, or may transmit the condition, which is not satisfied by the request information, to the manager terminal 5.

(2) Operation in Case Where Printing Restriction Information Is Changed

For a case of changing a date and time at which the printing requester "user A" performs printing or a place where printing is performed in accordance with a change in a meeting time with a business partner, an example of the operation of the printing apparatus 2 will be described.

In a case where the request information does not satisfy the condition indicated by the printing restriction information in step S7 because the date and time at which printing is performed or the place where printing is performed has changed (S7: No), "printing is stopped" is displayed on the operation display unit 23 (S10).

For example, the printing requester requests the manager to change the printing restriction information by e-mail or telephone. For example, it is assumed that the place where the "User A" performs printing is changed to Nishi-ku, Yokohama, and the time at which printing is performed is 12 o'clock. In this case, the place, in which printing is possible, of the printing restriction information ticket 31a shown in FIG. 3A is Hodogaya-ku, Yokohama, and the time at which printing is possible is from 10:00 to 11:00. Therefore, the items of the place at which printing is possible and the time at which printing is possible are not satisfied. The printing requester requests of the manager that a current place and time satisfy the condition indicated by the printing restriction information.

The manager accesses the server 3 from the manager terminal 5, changes the place, in which printing is possible, of the printing restriction information ticket 31a in FIG. 3A to in Nishi-ku, Yokohama, and changes the time at which printing is possible to, for example, 12:00 to 14:00. The manager notifies the printing requester of the change by e-mail or telephone. In a case where the manager permits printing, the manager corrects the printing restriction information.

In a case where execution of the print job 8 is instructed for the document ID "D001", it is determined that inquiry is necessary (S3: Yes), the server 3 is inquired (S5), the printing restriction information ticket 31*a* is acquired (S6: Yes), the request information satisfies the condition indicated by the printing restriction information (S7: Yes), the confidential level is determined to be "high" (S8: Yes), and printing is executed (S4).

First Modification Example

In the above exemplary embodiment, the print job 8 is fetched from the recording medium 7 to the printing apparatus 2 and the print job 8 is accumulated in the printing apparatus 2. However, the print job 8 may be transmitted from the user terminal 4 to the server 3 to be accumulated in the server 3, and the printing apparatus 2 may be logged in to perform the authentication process, so that the print job 8 may be downloaded from the server 3 to the printing apparatus 2.

Second Modification Example

One of the plurality of printing apparatuses 2 may have all or a part of the functions of the server 3. For example, one printing apparatus 2 may store the ticket management information table 30, the printing restriction information ticket 31, and the history information table 32, may compare the request information with the printing restriction information, and may determine whether or not printing is permitted.

Although the exemplary embodiment of the present invention has been described above, the exemplary embodiment of the present invention is not limited to the above exemplary embodiment, and various modifications and implementations are possible.

Each means of the processor may be configured with hardware circuits such as a Field Programmable Gate Array (FPGA) and an Application Specific Integrated Circuit (ASIC), which are partially or wholly reconfigurable.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, some of the components of the above exemplary embodiment may be omitted or changed. Further, in the flow of the above exemplary embodiment, steps may be added, deleted, changed, replaced, or the like. Further, the program used in the above exemplary embodiment can be recorded and provided on a computer-readable recording medium, such as a CD-ROM, and can be stored in an external server such as a cloud server, to be used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing control apparatus comprising:
   a processor configured to:
     receive instruction information including document data and information indicating whether or not it is necessary to inquire an external apparatus that holds restriction information indicating a condition for restricting printing of the document data;
     in a case where the instruction information includes the information indicating that the inquiry is necessary, acquire the restriction information in a case where the restriction information associated with the document data exists by inquiring the external apparatus; and
     permit printing of the document data in a case where information to be compared with the acquired restriction information satisfies the condition indicated by the restriction information,
     wherein in a case where confidentiality is necessary for the document data, the instruction information includes the information indicating that the inquiry is necessary, the processor is configured to permit printing of the document data in a case where the information to be compared satisfies the condition, and
     wherein in a case where confidentiality is not necessary for the document data, the instruction information does not include the information indicating that the inquiry is necessary, the processor is configured to permit printing of the document data.

2. The printing control apparatus according to claim 1, wherein
   in a case where the confidentiality of the document data is high, the instruction information includes the information indicating that the inquiry is necessary, the restriction information associated with the document data exists, and the processor is configured to:
   permit printing of the document data in a case where the information to be compared satisfies the condition, and
   in a case where the confidentiality of the document data is low, the instruction information includes the information indicating that the inquiry is necessary, the restriction information associated with the document data does not exist, and the processor is configured to:
   permit printing of the document data to record the printing as history information.

3. The printing control apparatus according to claim 1, wherein in a case where the restriction information associated with the document data does not exist, the processor is configured to:
   permit printing of the document data to record the printing as history information.

4. The printing control apparatus according to claim 1, wherein the restriction information is configured to enable presence and absence of the restriction and content of the restriction to be set for each item.

5. The printing control apparatus according to claim 2, wherein the restriction information is configured to enable presence and absence of the restriction and content of the restriction to be set for each item.

6. The printing control apparatus according to claim 3, wherein the restriction information is configured to enable presence and absence of the restriction and content of the restriction to be set for each item.

7. The printing control apparatus according to claim 1, wherein in a case where the information to be compared does not satisfy the condition, the processor is configured to:
output a reason why the condition is not satisfied.

8. The printing control apparatus according to claim 2, wherein in a case where the information to be compared does not satisfy the condition, the processor is configured to:
output a reason why the condition is not satisfied.

9. The printing control apparatus according to claim 3, wherein in a case where the information to be compared does not satisfy the condition, the processor is configured to:
output a reason why the condition is not satisfied.

10. The printing control apparatus according to claim 4, wherein in a case where the information to be compared does not satisfy the condition, the processor is configured to:
output a reason why the condition is not satisfied.

11. The printing control apparatus according to claim 5, wherein in a case where the information to be compared does not satisfy the condition, the processor is configured to:
output a reason why the condition is not satisfied.

12. The printing control apparatus according to claim 7, wherein the processor is configured to:
transmit the reason why the condition is not satisfied to a terminal device of a person who has authority to change the restriction information.

13. The printing control apparatus according to claim 1, wherein the condition indicated by the restriction information includes a place where a printing apparatus that prints the document data is installed and a time at which the document data is printed.

14. The printing control apparatus according to claim 13, wherein the condition indicated by the restriction information further includes information on a requester who requests printing.

15. The printing control apparatus according to claim 1, wherein the processor is configured to:
in a case where a person who has authority to change the restriction information requests a change in the restriction information, permit the change in the restriction information.

16. A non-transitory computer readable medium storing a program causing a computer to execute a process comprising:
receiving instruction information including document data and information indicating whether or not it is necessary to inquire an external apparatus that holds restriction information indicating a condition for restricting printing of the document data;
in a case where the instruction information includes the information indicating that the inquiry is necessary, acquiring the restriction information in a case where the restriction information associated with the document data exists by inquiring the external apparatus; and
permitting printing of the document data in a case where information to be compared with the acquired restriction information satisfies the condition indicated by the restriction information,
wherein in a case where confidentiality is necessary for the document data, the instruction information includes the information indicating that the inquiry is necessary, printing of the document data is permitted in a case where the information to be compared satisfies the condition, and
wherein in a case where confidentiality is not necessary for the document data, the instruction information does not include the information indicating that the inquiry is necessary,
printing of the document data is permitted.

* * * * *